(12) United States Patent
Kumar et al.

(10) Patent No.: US 11,249,983 B2
(45) Date of Patent: Feb. 15, 2022

(54) TRANSACTION CHANGE DATA FORWARDING

(71) Applicant: INTERNATIONAL BUSINESS MACHINES CORPORATION, Armonk, NY (US)

(72) Inventors: Nirmal Kumar, Bangalore (IN); Venkat R. Arra, Bengaluru (IN); Rashmi Bharadwaj, V, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 241 days.

(21) Appl. No.: 16/373,044

(22) Filed: Apr. 2, 2019

(65) Prior Publication Data
US 2020/0320059 A1 Oct. 8, 2020

(51) Int. Cl.
*G06F 16/23* (2019.01)
(52) U.S. Cl.
CPC ...... *G06F 16/2379* (2019.01); *G06F 16/2358* (2019.01); *G06F 16/2365* (2019.01)
(58) Field of Classification Search
CPC ............. G06F 16/2379; G06F 16/2365; G06F 16/2358; G06F 16/27; G06F 2201/855; G06F 11/2056; G06F 16/1865; G06F 16/184; G06F 16/1844; G06F 16/273; G06F 16/275; G06F 16/235; G06F 16/23; G06F 9/466; G06F 16/2308; G06F 11/2064; G06F 2201/82; G06F 16/2315; G06F 16/278; G06F 16/2386; G06F 16/2322; G06F 16/2329; G06F 16/2336; G06F 16/2343;

(Continued)

(56) References Cited

U.S. PATENT DOCUMENTS

| | | | | |
|---|---|---|---|---|
| 7,657,576 B1* | 2/2010 | Norcott | ................. | G06F 16/254 707/999.202 |
| 9,244,775 B2 | 1/2016 | Koza et al. | | |
| 10,706,041 B1* | 7/2020 | Hoffmann | ............. | G06F 11/004 |

(Continued)

OTHER PUBLICATIONS

"External table mirror bulk apply", IBM Knowledge Center. Retrieved on Feb. 25, 2019 from the Internet URL: <https://www.IBM.com/support/knowledgecenter/en/SSTRGZ_11.4.0/com.IBM.cdcdoc.performancetuning.doc/tasks/mirrorbulkapply_fastapply.html>, 5 pgs.

(Continued)

*Primary Examiner* — David T. Brooks
(74) *Attorney, Agent, or Firm* — William Hartwell; Matthew M. Hulihan; Heslin Rothenberg Farley & Mesiti PC

(57) ABSTRACT

Transaction change data replication includes identifying changes being made to a source database as part of an ongoing transaction at a source. The identifying is performed as the changes are made to the source database and as the transaction remains ongoing prior to commit or rollback thereof at the source. The source and a target are in a replication relationship in which data of the source database at the source is replicated to destinations in a target database at the target. The indications of the changes being made to the source are forwarded, to the target, as the transaction remains ongoing prior to commit or rollback thereof, and based on ending the transaction at the source, an indication of the transaction end is sent to the target.

20 Claims, 10 Drawing Sheets

(58) Field of Classification Search
CPC .. G06F 16/25; H04L 29/0854; H04L 67/1095
See application file for complete search history.

(56) References Cited

U.S. PATENT DOCUMENTS

| | | | | |
|---|---|---|---|---|
| 2004/0098425 | A1* | 5/2004 | Wiss | G06F 16/275 |
| 2006/0047684 | A1* | 3/2006 | Cherkauer | G06F 11/2097 |
| 2006/0200507 | A1* | 9/2006 | Holenstein | G06F 16/273 |
| 2012/0023369 | A1* | 1/2012 | Bourbonnais | G06F 9/466 |
| | | | | 714/16 |
| 2012/0030172 | A1* | 2/2012 | Pareek | G06F 16/10 |
| | | | | 707/635 |
| 2012/0084260 | A1* | 4/2012 | Cherkauer | G06F 16/2308 |
| | | | | 707/648 |
| 2014/0279907 | A1* | 9/2014 | Koza | G06F 16/128 |
| | | | | 707/639 |
| 2015/0149409 | A1* | 5/2015 | Lee | G06F 16/27 |
| | | | | 707/623 |
| 2015/0205850 | A1* | 7/2015 | Lu | G06F 16/2358 |
| | | | | 707/615 |
| 2015/0293820 | A1* | 10/2015 | Doshi | G06F 16/273 |
| | | | | 711/162 |
| 2016/0147859 | A1* | 5/2016 | Lee | G06F 11/1469 |
| | | | | 707/615 |
| 2016/0179919 | A1* | 6/2016 | Martin | G06F 16/242 |
| | | | | 707/602 |
| 2016/0328461 | A1* | 11/2016 | Ahmed | G06F 16/27 |
| 2016/0335302 | A1 | 11/2016 | Teodorescu | |
| 2017/0177658 | A1* | 6/2017 | Lee | G06F 11/1451 |
| 2017/0322993 | A1* | 11/2017 | Brodt | G06F 16/2358 |
| 2018/0253483 | A1* | 9/2018 | Lee | G06F 16/2358 |
| 2019/0303470 | A1* | 10/2019 | Lee | G06F 16/2282 |
| 2019/0361913 | A1* | 11/2019 | Yoon | G06F 16/273 |
| 2019/0384775 | A1* | 12/2019 | Wen | G06F 16/2379 |

OTHER PUBLICATIONS

Well, Peter, et al., "The NIST Definition of Cloud Computing", NIST Special Publication 800-145, Sep. 2011, Gaithersburg, MD, 7 pgs.

Kaur, K., et al., "Database Replication Using Eager Replication", vol. 3, Issue 9, Sep. 2013, IJARCSSE, pp. 1166-1168. Retrieved on Feb. 25, 2019 from the Internet URL: <http://ijarcsse.com/Before_August_2017/docs/papers/Volume_3/9_September2013/V3I9-0354.pdf>, 3 pgs.

"Improving Target Database Performance with Fast Apply", retrieved on Dec. 20, 2018 from the Internet URL: <https://www.ibm.com/support/knowledgecenter/SSTRGZ_10.2.1/com.ibm.cdcdoc.performancetuning.doc/concepts/mprovingtargetdatabaseperformancewillifastapply.html>, 3 pgs.

Lee, J., et al., "Parallel Replication across Formats in SAP HANA for Scaling Out Mixed OLTP/OLAP Workloads", Proceedings of the VLDB Endowment, retrieved on Feb. 25, 2019 from the Internet URL: <http://www.vldb.org/pvldb/vol10/p1598-han.pdf>, vol. 10, Issue 12, 2017, pp. 1598-1609.

"Parallel processing and the InfoSphere CDC replication pipeline", retrieved on Mar. 14, 2019 from the Internet URL: <https://www.ibm.com/support/knowledgecenter/en/SSTRGZ_10.21/com.ibm.cdcdoc.performancetuning.doc/concepts/maximizingtheparallelprocessing.html>, IBM Corporation 2013, 4 pgs.

* cited by examiner

TRANSACTION CHANGE DATA FORWARDING

BACKGROUND

Data replication, also referred to as change data capture (CDC), provides trusted data synchronization between a source database and one or more target databases. The source database collects transactions as they are committed and saves them in a repository. Specialized agents send the committed transactions across a network to the target computer where they are received by other specialized agents and applied to the target database. In this way, the target database may be a duplicate of the source database. If the source computer, source database, or network fails, the target database may act as source database in place of the initial source database.

In particular examples, when a source database system, such as a Relational Database Management system ("relational DBMS" or "RDBMS"), makes changes to the source database, it writes "log records" that contain the data for redo and undo segments necessary to recover the database from a failure. These log records can be used by a CDC replication system to replicate the changes to a different (e.g. target) database. For instance, the appropriate changes may be replicated upon transaction commit over to the target. Example databases/database systems include the DB2® and Informix® products offered by International Business Machines Corporation, Armonk, N.Y., USA (of which DB2 and INFORMIX are registered trademarks); the Oracle® Database management system offered by Oracle Corporation, Redwood Shores, Calif., USA (of which ORACLE is a registered trademark); the Microsoft® SQL (MSSQL) Server offered by Microsoft Corporation, Redmond, Wash., USA; the SAP® Adaptive Server Enterprise and various other offerings from SAP SE, Walldorf, Germany (of which SAP and ADAPTIVE SERVER are trademarks); so called NoSQL databases implementing various data models; and the Apache Hadoop® and Apache Kafka® offerings developed by The Apache Software Foundation, Forest Hill, Md., USA (of which HADOOP and KAFKA are registered trademarks).

SUMMARY

Meeting desired performance, throughput, latency, and scalability characteristics of enterprise applications can present challenges. Drawbacks to conventional approaches for transaction replication are addressed herein.

Shortcomings of the prior art are overcome and additional advantages are provided through the provision of a computer-implemented method. The method includes identifying changes being made to a source database as part of an ongoing transaction at a source. The identifying is performed as the changes are made to the source database and as the transaction remains ongoing prior to commit or rollback of the transaction at the source. The source and a target are in a replication relationship in which data of the source database at the source is replicated to destinations in a target database at the target. The method includes forwarding, to the target, as the transaction remains ongoing prior to commit or rollback thereof, indications of the changes being made to the source. The method also includes, based on ending the transaction at the source, sending to the target an indication of transaction end.

Further, a computer system is provided that includes a memory and a processor in communication with the memory, wherein the computer system is configured to perform a method. The method includes identifying changes being made to a source database as part of an ongoing transaction at a source. The identifying is performed as the changes are made to the source database and as the transaction remains ongoing prior to commit or rollback of the transaction at the source. The source and a target are in a replication relationship in which data of the source database at the source is replicated to destinations in a target database at the target. The method includes forwarding, to the target, as the transaction remains ongoing prior to commit or rollback thereof, indications of the changes being made to the source. The method also includes, based on ending the transaction at the source, sending to the target an indication of transaction end.

Yet further, a computer program product including a computer readable storage medium readable by a processing circuit and storing instructions for execution by the processing circuit is provided for performing a method. The method includes identifying changes being made to a source database as part of an ongoing transaction at a source. The identifying is performed as the changes are made to the source database and as the transaction remains ongoing prior to commit or rollback of the transaction at the source. The source and a target are in a replication relationship in which data of the source database at the source is replicated to destinations in a target database at the target. The method includes forwarding, to the target, as the transaction remains ongoing prior to commit or rollback thereof, indications of the changes being made to the source. The method also includes, based on ending the transaction at the source, sending to the target an indication of transaction end.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
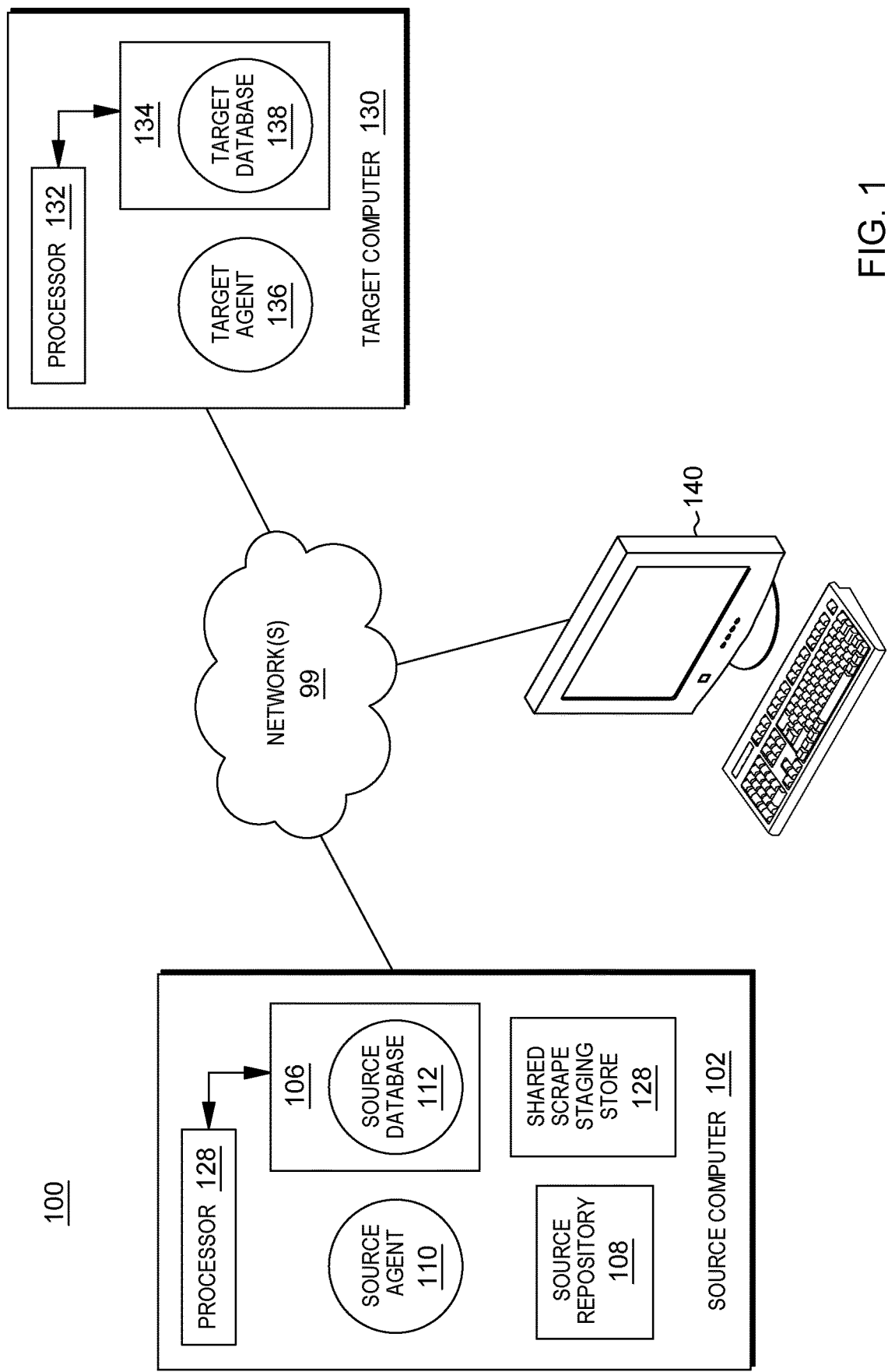
FIG. 1 illustrates an example computer environment for change data capture.

FIG. 1 illustrates an example computer environment for change data capture (CDC). In some embodiments, aspects described herein can be incorporated and/or used in the example computer environment of FIG. 1. An exemplary CDC computer environment 100 is operable for data replication. CDC is the process of capturing changes made at the data source (e.g. at a source location and corresponding systems) and applying them to target(s) (e.g. at target location(s) and corresponding systems). In this illustrative example, the CDC computer system 100 includes a source computer 102 on which transactions are made and target computer 130 that receives committed transactions from the source computer 102. In other embodiments, there may be additional targets. Each computer 102, 130 includes a respective at least one processor (128, 132, respectively) and a respective at least one storage device (106, 134 respectively). The CDC computer system 100 additionally includes an administrative client computer 140, also having at least one processor and at least one storage device. Each computer and administrative client communicates over one or more network(s) 99. The network(s) 99 may include various types of communication networks, such as a wide area network (WAN), local area network (LAN), a telecommunication network, a wireless network, a public switched network and/or a satellite network. The source computer 102, target computer 130, and administrative client computer 140 may each be implemented as separate physical computers, as virtual partitions on one or more physical computers, or a combination, as examples.

Source computer 102 in the CDC computer system 100 includes a source database 112. Target computer 130 includes a target database 138 configured to receive change data records from the source database 112 of the source computer 102. The target database 138 may be or include a relational DBMS, such as an IBM® DB2® (IBM is a trademark of International Business Machines Corporation) or ORACLE® RDBMS, and/or a non-relational DBMS, such as Apache Hadoop®.

The CDC computer system 100 includes one or more source agents, one of which, 110, is shown. The source agent 110 and a target agent 136 are provided in the data replication configuration to enable selective replication of committed transactions to the target database 138. Agents 110 and 136 are two CDC replication agents.

The source agent 110 extracts the transaction records from the database transaction logs that the source database 112 writes and stores in source repository 108. The extracted transaction records are destined for the target in order to inform of changes to make on the target database 138. The content and format of the transaction records may depend upon the vendor's implementation of the source database 112, but in some examples include one or more entire table rows. A transaction log may also be referred to as a "transaction log file", "log file", "transaction log" and/or "log".

In this example, the source agent 110 extracts from source repository 108 the records for a transaction when a commit of that transaction is seen and uses these transaction records to build and maintain the Shared Scrape Staging Store 128. Note that any log records from 108 that are for transactions that are aborted/rolled-back may optionally be discarded.

As described above, when a RDBMS makes changes to the database, it writes log records that contain the data necessary to redo and undo the operation(s). These records may be useful for recovery in case of a failure. These log records can be used by the CDC replication system to replicate and make the changes to a different database. Each database has a way of identifying each log record, for instance by way of an identifier referred to as a "log record identifier" (LRI). Conventional CDC replication systems replicate only committed transaction data, storing the log records for a transaction until either a commit or an abort/rollback of the transaction is seen. If a commit is seen, the log records may be replicated to the target. If an abort is seen, the log records for the rolled back/aborted transactions may be discarded from the CDC transaction queue. Database metadata typically includes information about transaction size, runtime, status (open/closed, open/ended, etc.), results (commit vs. abort/rollback), and other information, which is accumulated in an ongoing fashion as transactions are processed. The presence of large (in size, changes, etc.) transactions can be identified, and the information can inform how the transactions are rolled-back. The age (% age) of commits and rollbacks can also be ascertained. The database metadata and logs can be read to identify transaction commits.

Many replication scenarios have two phases—a Refresh phase and a Mirroring phase. An example Refresh phase, referred to as "refresh while active", is used in an initial synchronization. In this phase, initial data of the database, already having been committed when replication/synchronization is initialized, is read and synchronized from the source to the target as the source database is being 'hit' by new changes of other transaction(s), such as inserts, updates, and/or deletes, as examples. In this manner, changes that are part of active, ongoing transactions are being performed against the source database in parallel to the synchronization being performed as part of the refresh, and this occurs while the refresh is running.

The Mirroring phase, also referred to as "continuous mirroring", occurs after the refresh while active phase. Next delta changes (transactions) in the transaction log are read on an ongoing basis and sent to the replication target. Continuous mirroring replicates changes to the target on a continuous basis, meaning ongoing as the changes are committed, regardless of whether the changes are being implemented intermittently, continuously, or periodically. During the Mirroring phase, a replication source 'engine' captures changed data from the database transaction logs and places the data for in-scope transactions into a transaction queue. Once committed, changed data is placed into replication metadata as part of a 'replication transaction repository'. Change data corresponding to the rolled-back transactions (used herein interchangeably with "aborted" transactions) are thrown out from the transaction queue. The replication transaction repository at the source stores the data and metadata for each of the transactions in the same fashion as it occurred in source database. After committed data is stored in the replication transaction repository, it can then be sent to a target replication 'engine', which can apply the data manipulation language (DML) statements to the target database row-by-row of the data coming from the source and in the same sequence as it occurred on source database, thereby maintaining data integrity and data consistency. Apply DML statements may be common INSERT, UPDATE and/or DELETE statements (as examples) at the target database.

Aspects described herein provide opportunities improving data replication activities, for instance improvements in performance during the mirroring described above. Currently, as described, CDC replicates changes only for the transactions that have been committed. The transactions that have not yet committed reside on the source system and further handling of the changes under the transaction stalls waiting for a commit (or other transaction end) to occur. For instance, transactions that have not yet been committed may be stored in a memory-mapped file transaction queue that resides on the source system. Once a transaction is committed, the changes made as part of the transaction are sent to the target across a network and can be applied row-by-row by an apply process, for instance using DML statements in the same manner as they occurred on the source. If a transaction is aborted/rolled-back, then in some examples the target is not notified of the transaction or its roll-back.

As a consequence of the above, the trigger for sending changes to the target is the commit of the transaction on the source side regardless of the size of the transaction, e.g. size of the change data. The change data of a single transaction could be one or several gigabytes (GB) in some examples. Only after the commit is seen will the entire change data be sent via the network to the target for an apply process at the target to then apply the changes to the target database on a row-by-row basis. This causes target latency, which can be quite large and impactful in some examples. For instance, a major hindrance to end users is undesirably high target latency, which can occur when large transactions are involved. Target latency refers to the difference between the time that the entry in the database log record is written and the time at which CDC applies the operation to the target database.

Described herein are approaches for transaction change data replication. Changes being made as part of a transaction at a source are identified, and indications thereof are forwarded to a target as the transaction remains open, e.g. not yet committed and not yet rolled-back on the source. Eventually, the transaction is committed or rolled-back, at which point the changes that are part of the transaction have already been forwarded to the target, sent from the source onto the network. In some examples, the changes are maintained in external flat files to be bulk-applied and committed to the target database. Based on receiving an indication of commit, the target can perform the apply. Latency in transferring the changes to the target after commit at the source is avoided.

As noted, conventional CDC operation does not provide change data to the target until the changes are committed at the source. In the meantime, the change data is held at the transaction queue of the source. In contrast, aspects described herein send the data to the target via the network even as the transaction remains open, i.e. without waiting for a commit (or rollback, abort, or other transaction end) at the source database.

In some examples, replication algorithms of conventional CDC processing are amended, for instance to process change records (i) as they are written, and/or (ii) absent and without waiting for an indication that the transaction performing the changes has ended with a commit or rollback. This is in contrast to, for instance, holding the records on the source and waiting for a transaction commit or other completion. In some examples, change records and associated intermediary helper records or metadata are processed to send the changes to the target while the transaction remains open, prior to a commit or rollback, and these records can be removed, deleted, archived, etc. after they are processed. Maintaining the records until transaction completion and for subsequent processing, as would have been performed in the conventional case that awaits transaction completion, is avoided. The replication pipeline, including at the source, the target, and in the network transfer, can thereby be optimized.

Absent operation in accordance with aspects described herein, the (i) writing from transaction queue to the staging store, (ii) writing from the staging store to the network, (iii) writing from the network to the target side's storage (such as an external table flat file), and finally (iv) applying the changes, would wait until a commit is performed on the source database. In contrast, and in accordance with aspects described herein, the foregoing aspects of the replication pipeline could be performed pro-actively and in-advance (perhaps significantly in advance) of transaction commit, and particularly as long/large transactions progress in parallel to the replication of the changes. Awaiting a source commit or other transaction completion indication is avoided. When a source DML operation/statement is seen, then in one example an indication of that operation is written from the transaction queue to the staging store, then from the staging store to the network and to a target agent. On the target, an external table structured as a flat file can be created and can stage the changes to be applied at the target, for instance upon receiving an indication of commit of the transaction on the source, or perhaps prior to receiving such indication. The changes in the external table could be applied as part of a batch execute (prepared statement job) on the target. In some examples, seeing a commit of the transaction either in database metadata or a transaction log can trigger an immediate bulk-apply via a batch, for instance 'Insert into <target table> select * from <external tables>' as one example. An analogous approach can be taken for deletes.

A mirror bulk apply or "fast apply" approach can be utilized in some examples. Transaction changes can be stored in external tables corresponding to different DMLs, e.g., INSERT and DELETE external tables, in which updates are converted into INSERT and DELETE operations pursuant to a CDC feature known as Mirror Bulk Apply. Once the source engine sees the commit for those transactions, the Mirror Bulk Apply can be activated to bulk-apply the changes based on the external tables in a fast manner, for instance by using a prepared statement execute job that executes SQL. This avoids applying row-by-row, in which each DML statement seen on the source is also applied as a corresponding DML statement on the target. In such a row-by-row approach, if there are, e.g., 100 DMLs in a transaction on the source, then there would be a corresponding 100 DML statements created and applied on target.

In a Mirror Bulk APPLY approach, an apply job creates external table file(s) and a separate prepared statement execute job (actual DML statement batch job, such as 'insert into <target_table> select * from <external table>) are provided for each target database. In this approach, for each unit of work (UOW), all of the deletes from a given table are performed by a single delete with an external table statement, and all of the inserts from a given table are performed by a single insert with an external table statement. This batching at target results in a significant boost in performance throughput. It may be beneficial for performance reasons to use separate threads to write a file (i.e. write by an apply job thread) and read the file (i.e. read by a prepared statement execute job thread). When the apply job finishes writing the delete file and sends the delete from external table statement to the execute load job thread, the apply thread could begin writing the insert file. In this manner, the insert file may be written while the delete file is being read.

Additional aspects are provided for rollback situations when transactions end with an abort or rollback. In an approach, the source notifies the target of the rollback and the target can handle the situation in any way it desires.

Figure 2:
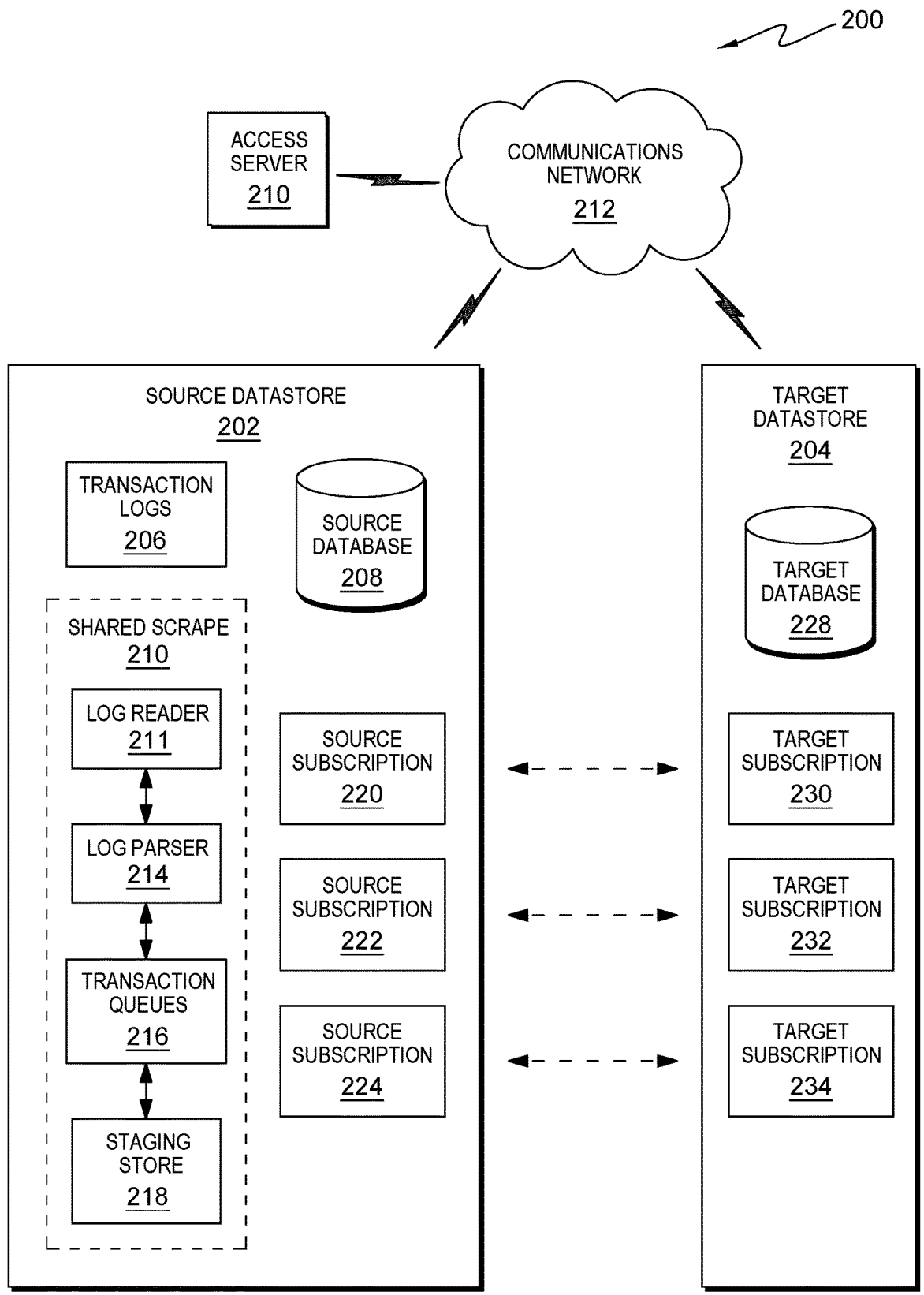
FIG. 2 depicts an example environment to incorporate and use aspects described herein.

FIG. 2 depicts an example environment to incorporate and use aspects described herein. The environment 200 includes a source one or more computer systems 202 at a source location and a target one or more computer systems 204 at a target location. The systems communicate with each other, which includes passing change data from one location to another via communications network 212. Also in communication with source and/or target systems is access server 210, an example of which is an administrative client computer (e.g. 140 of FIG. 1).

Source 202 holds transaction logs 206 indicating changes made to source database 208. Shared scrape component 210 includes a log reader 211 to read the logs 206 and log parser 214 to parse the read log entries. In-scope changes are indicated and saved in transaction queues 216, from which they are staged in staging store 218 for replicating to the target 204. Specifically, indications of the changes are forwarded to the target pursuant to subscription(s) and for application to the target database 228.

Subscriptions identify data that is within the scope ("in-scope") and outside of the scope ("out-of-scope") of the replication activity. They often identify in-scope and out-of-scope data at the table level. In a production database, there might be hundreds, thousands, or more tables being updated concurrently by many business users as part of many simultaneous transactions. Replication relationship(s) may be configured to replicate only a subset (say, 50) of those tables from the source to the target. Tables that are part of a replication subscription are the in-scope tables and the rest are out-of-scope tables. Subscriptions can identify any tables, contiguous or not, for replication.

In FIG. 2, there are three source subscriptions (220, 222, 224) corresponding to three target subscriptions (230, 232, 234). A subscription is a mapping of table(s) between the source engine and target engine, providing a connection to replicate data between the source datastore and the target datastore, for instance containing details of the data that is being replicated and how the source data is applied to the target.

Figure 3:
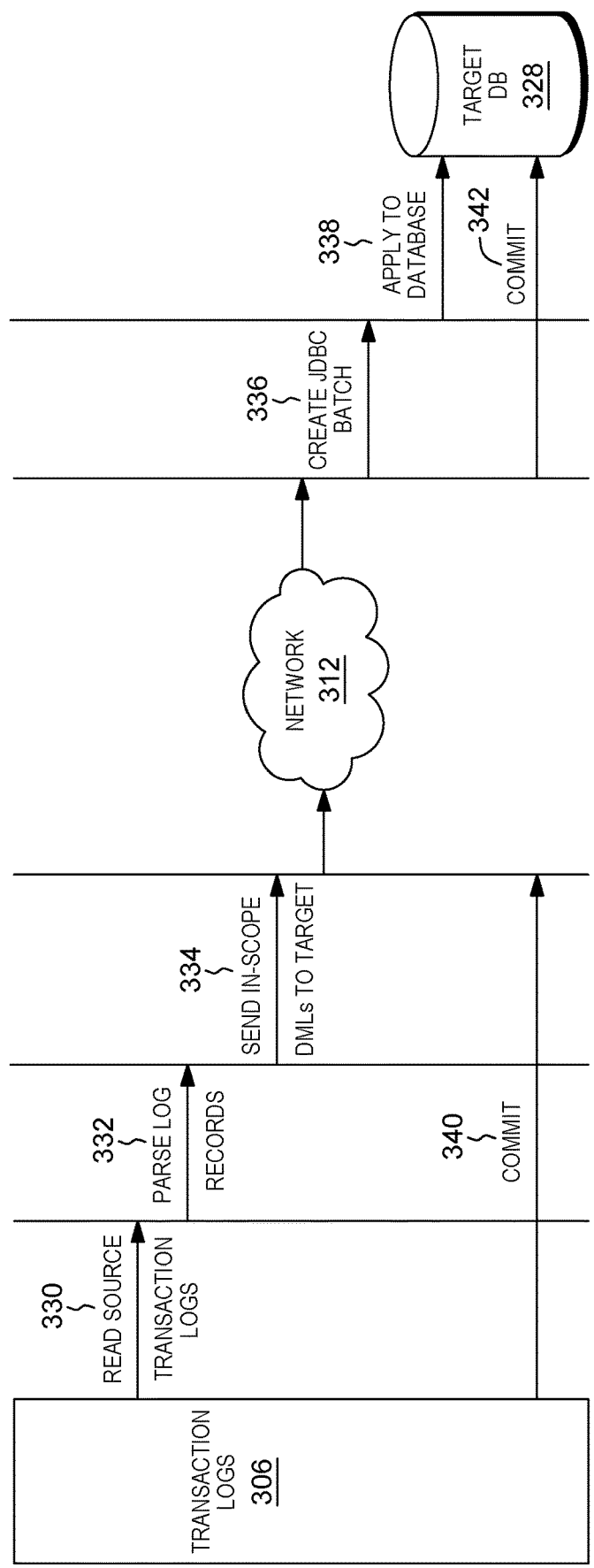
FIG. 3 depicts a conceptual flow of data during a transaction, in accordance with aspects described herein.

FIG. 3 depicts a conceptual flow of data during a transaction, in accordance with aspects described herein. The flow may be implemented by a collection of one or more processes executing on one or more computer systems.

At the source side, the flow reads (330) the source transaction logs 306 that include changes pursuant to one or more open transactions, then parses (332) the log records, e.g. for in-scope DMLs—data manipulation language statements, and sends (334) the in-scope DMLs to the target. These are sent across network 312 to the target side where the flow creates (336) a batch job, in this example a JDBC (Java Database Connectivity) batch. JDBC is one example of an appropriate application programming interface (API), though many others are possible depending on the particular database implementation.

Additional changes, for instance those that are part of a single or several transactions, may be accumulated in the batch. At some point, the batch changes are applied (338) to the target database 328. The apply can be performed at any of various different points in time relative to other actions of the flow. In the example of FIG. 3, the changes are applied at some point before a commit of a transaction for which the changes are being replicated. It may be desired in some situations to apply changes prior to an indication of commit or rollback of the transaction. In other examples, the apply at the target is not performed until after an indication of transaction end (commit or rollback) is received. In yet other examples, the changes are not/never applied, and may be discarded instead.

At the source side, a commit 340 of the transaction occurs. An indication of this is provided to the target side, where a target-side commit 342 commits the changes to the database 328. Until the commit (340/342) is done, the changes are not committed to database 328. The records may have been written and applied to the database without a commit of those changes thereto. In one example, the commit 342 refers to writing/updating a bookmark on the target, the bookmark indicating the target-side commit as having been performed. In some examples, bookmarks are used as a form of handshake or verification between the source and target.

Figure 4:
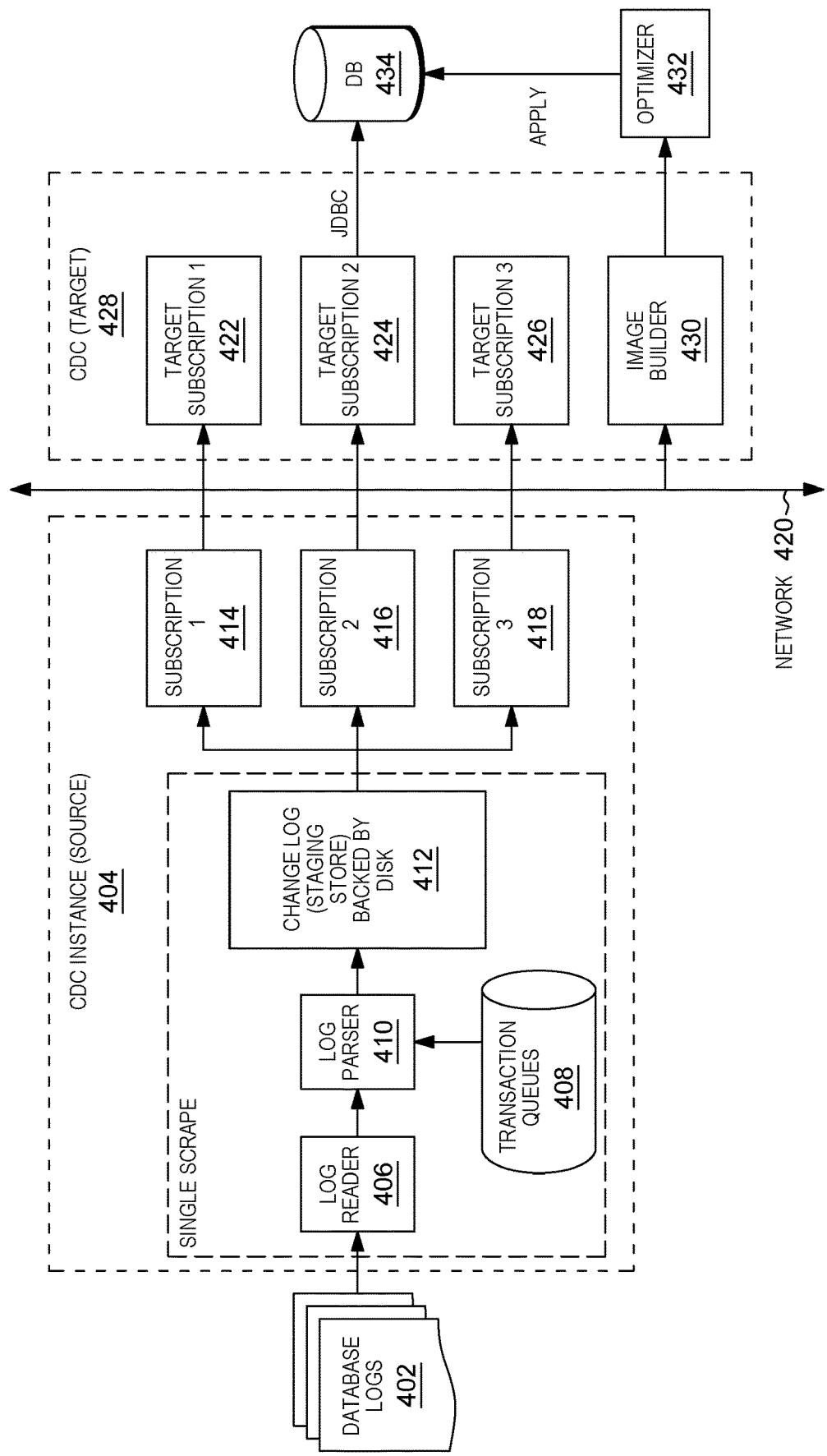
FIGS. 4 and 5 depict example approaches for applying identified changes to a target database in a change data capture environment, in accordance with aspects described herein.
Figure 5:
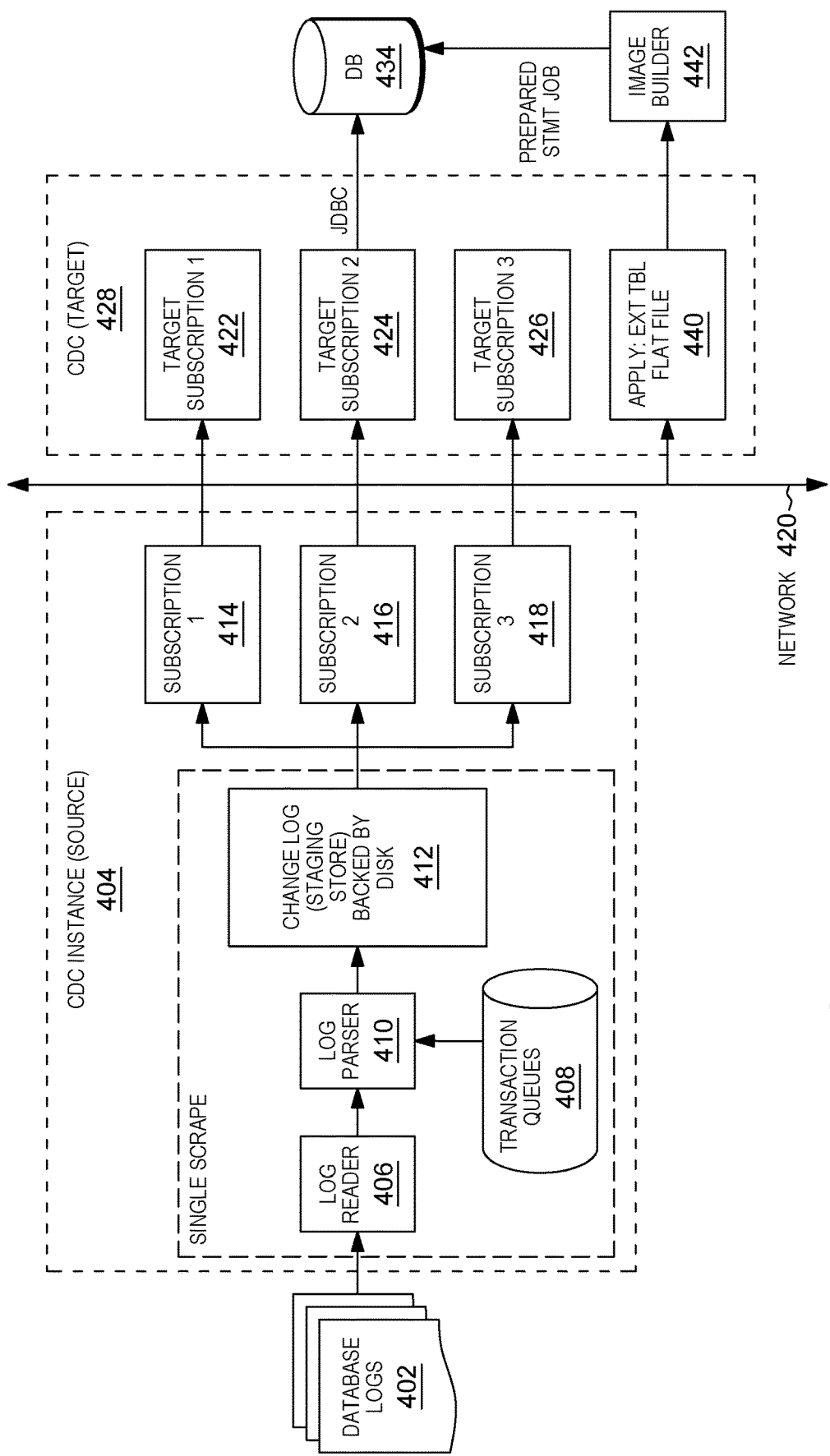

FIGS. 4 and 5 depict example approaches for applying identified changes to a target database in a change data capture environment, in accordance with aspects described herein. FIG. 4 depicts an example CDC single scrape architecture with a standard Apply. Similar to FIG. 2, log reader 406 reads database logs 402 of a source CDC instance 404 and filters log records to send only in-scope table entries to a log entry queue (not shown). The log parser 410 reads from the log entry queue and stages these in the transaction queue 408 for each transaction until complete (commit entry seen), and then decodes the operations into the parsed entry queue. In accordance with aspects described herein, the log parser 410 stages the changes in change log 412. The changes are forwarded pursuant to individual subscriptions 414, 416, 418 across network 420 to components handling target subscriptions 422, 424, 426, respectively, at target CDC instance 428. Meanwhile, image builder 430 at the target builds image(s) of the changes flowing over network 420. An optimizer 432 applies optional optimizations pursuant to user preference/specifications. The changes from the image are then applied to target database 434. Here, a standard CDC 'fast apply' is performed. In a fast apply, there are n (e.g. 4, 8, 12, etc.) concurrent database connections of the apply thread that apply, in-parallel, DMLs of or based on the built image. This is in contrast to a single-connection JDBC apply, for instance, where a single connection/thread is used to apply data on to target. In the case of fast apply, CDC spawns multiple threads at the target (using concurrent database session) that can be used to apply data to target in parallel. A batch apply as discussed herein can lend even greater performance improvements over both the normal (single connection) and the fast apply approaches.

FIG. 5 depicts an example CDC single scrape architecture with a mirror bulk Apply. Many components of FIG. 5 match those of FIG. 4, including database logs 402, source CDC instance 404, log reader 406, transaction queues 408, log parser 410, change log 412, subscriptions 414, 416, 481, network 420, target subscriptions 422, 424, 426, target CDC instance 428, and database 434. In FIG. 5, however, external tables 440 that are structured as flat files (for instance each corresponding to a table of database 434 for which changes are reflected) are built from changes flowing to the target from the source. These are constructed into a prepared statement job by image builder 442 for Apply/"load" to the target database 434. The loading can occur at the database page level, for instance, and therefore occur relatively quickly in comparison to other apply approaches.

Aspects described herein could be implemented using either of the Apply approaches in FIGS. 4 and 5, and other approaches as well.

Accordingly, approaches described herein may be desirable and advantageous in many different situations. One such situation is when the emphasis of the user/admin (of replication functionality) is less on the sequence of the transactions replicated to the target and more on the data being replicated quickly to the target so it possesses the most current data. In other words, the user is focused less on the history of transactions and more on the most recent data and reducing/minimizing latency.

Aspects described herein are inextricably tied to computer technology and facilitate processing within computer systems, providing advantages and improvements, including improvements in performance thereof. For instance, aspects provide performance throughput increase within the entire CDC pipeline from source to target.

In addition, target latency decreases because time taken to transfer data after commit is reduced, in some cases to zero. At high data volumes, the approach scales better and provides more significant impact in comparison to conventional approaches.

Furthermore, aspects can save memory space and lessen global memory usage. Traditionally, change records are read from the transaction log and placed into transaction queues of specific (though expandable) size. Transaction queue sizing is typically handled by an algorithm at the source. Large transactions dictate larger global memory management (GMM) memory and disk space to hold such transactions in the source transaction queue (memory mapped files). This demand for greater space is eliminated according to aspects described herein because the records can be sent to the target as soon as the changes are observed, rather than maintaining them at the target in queue/stage. In conventional approaches, a 1 GB transaction would have its changes queued until commit but this is avoided in accordance with the approach presented herein. Additionally, if a transaction is aborted, it may not be required to re-read the logs for long running and large transactions.

Figure 6A:
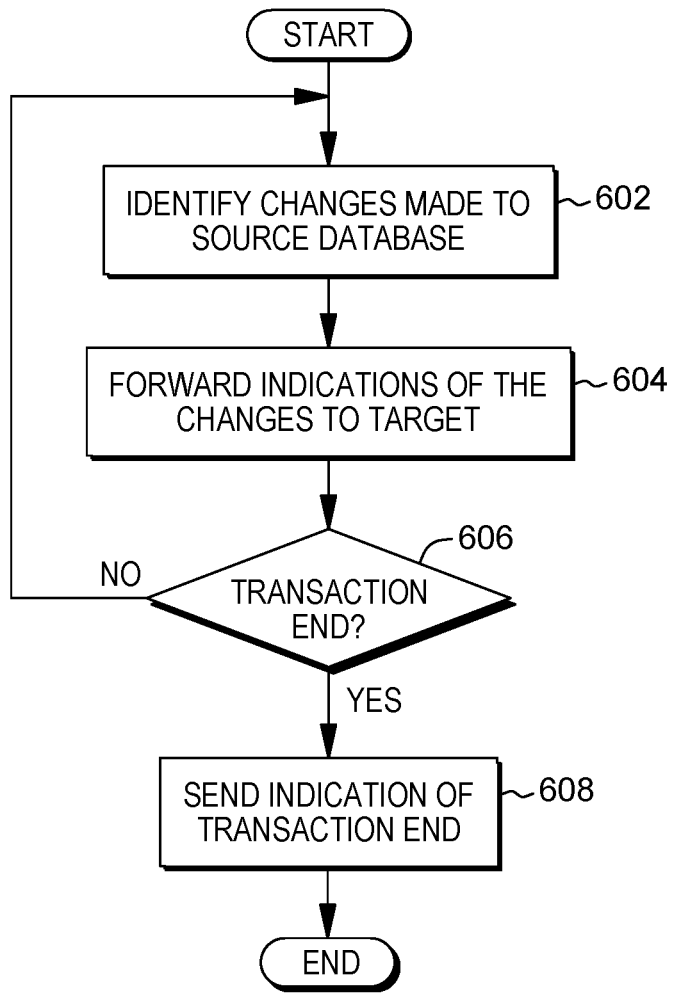
FIGS. 6A-6B depict example processes for transaction change data replication, in accordance with aspects described herein.
Figure 6B:
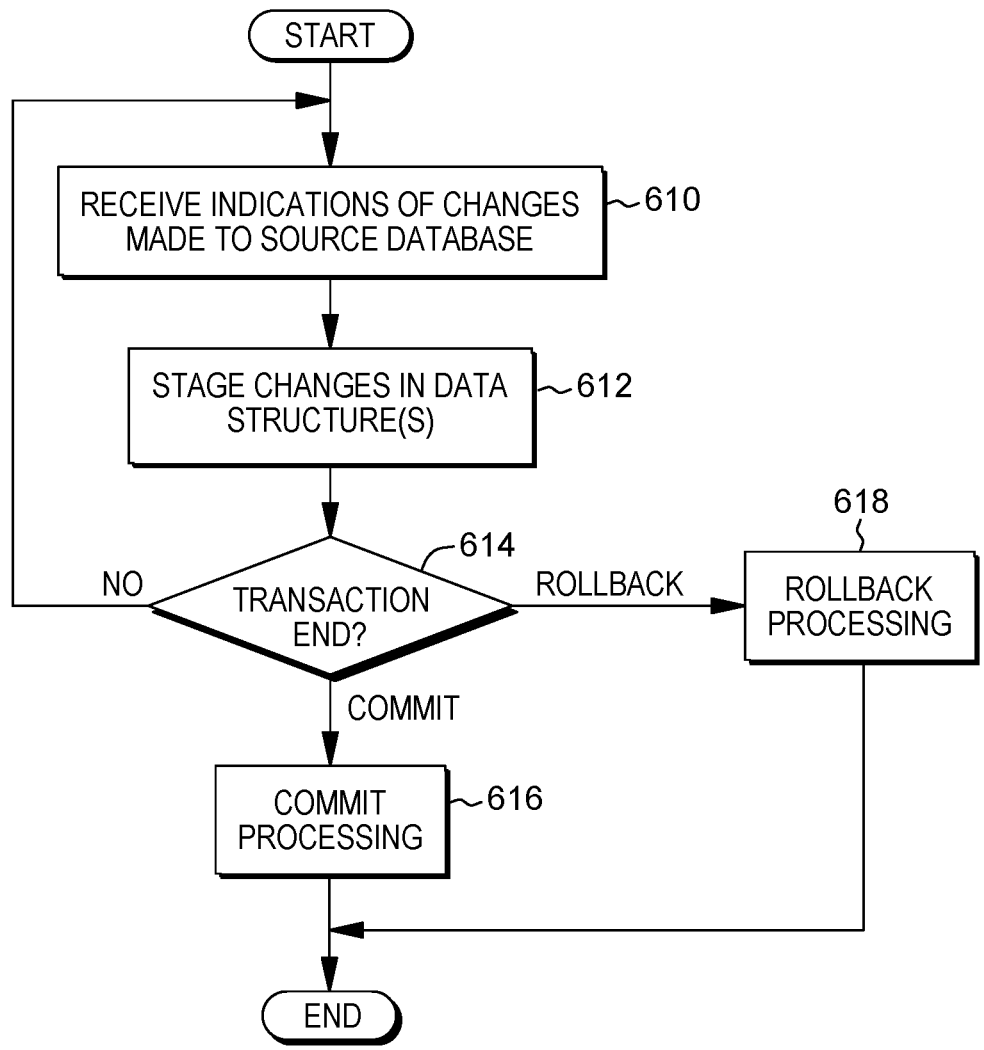

FIGS. 6A and 6B depict example processes for transaction change data replication, in accordance with aspects described herein. In some examples, the processes or aspects thereof are performed by computer system(s) at a source location, computer system(s) at a target location, a combination of the foregoing, and/or other computer systems, including those described herein.

FIG. 6A depicts example processing from a perspective of actions of a source side of a data replication relationship. The process identifies (602) changes being made to a source database as part of an ongoing transaction at a source, e.g. source system at a source location. The identifying can be made as the changes are made to the source database and as the transaction remains ongoing/open, e.g. prior to a commit or a rollback of the transaction at the source. The source and a target, e.g. target system at a target location, are in a replication relationship in which data of the source database at the source is replicated to destinations in a target database at the target. The destinations are, for instance, table(s) of the target database and which are distinguished from, e.g., external tables/files where incoming changes may be staged for application to the destinations in the target database.

The process forwards (604), to the target, and as the transaction remains ongoing prior to commit or rollback thereof, indications of the changes being made to the source. In a particular approach, each identified change of the identified changes corresponds to a respective trigger, and performance of that change activates that trigger, to forward a respective indication of the identified change to the target. Thus, each change observed can trigger forwarding a corresponding indication of the change to the target, which is in contrast to, for example, waiting until after a transaction commit and/or waiting until a threshold number or size of changes is reached before forwarding the indications (though that is a possibility in accordance with aspects described herein).

In particular examples, the process, based on the respective trigger corresponding to a change, writes data from a transaction queue to a staging store at the source, and sends the data, as the indication of the change, across a network to a target agent of the target, as the transaction remains ongoing. The path of the change can therefore proceed through the source and to the target as in other, e.g. conventional, approaches, except that it is performed proactively before the transaction has ended.

In some examples, the identifying the changes includes reading one or more transaction logs at the source and parsing transaction log records for the changes. The parsing the transaction log records for the changes can identify data manipulation language (DML) statements that are identified by the transaction log records and are in-scope of the replication relationship. The indications of the changes can include the in-scope data manipulation language statements forwarded to add to a batch job to be applied at the target.

Continuing with FIG. 6A, the process determines (606) whether the transaction has ended. As long as the transaction has not ended (606, N), the process can loop through 602 and 604, replicating changes to the target on an ongoing basis as the transaction remains ongoing. Based on an ending of the transaction at the source (for example by way of a commit or rollback of the transaction), inquiry 606 is answered in the positive (606, Y). The process proceeds by sending (608) to the target an indication of transaction end, e.g. an indication of commit or rollback.

At transaction end, then in some situations the identified changes have all been forwarded to and staged at the target as part of the forwarding. In other situations, the changes are still in the process of being replicated. The latter scenario may arise when a large (in size) change is made at the source and the transaction is soon-after committed, i.e. before the data of the large change has been completely forwarded across the network.

In some examples, all (rather than just a portion) of the changes included in a transaction are forwarded to the target and, in accordance with aspects described herein, the forwarding forwards all such changes included in the transaction so as to replicate them to and stage them on the target prior to commit or rollback of the transaction at the source.

A transaction end can include a rollback of the transaction at the source, and the indication of transaction end sent to the target can include an indication of rollback of the transaction. This is in contrast to approaches that wait until transaction commit to send any such changes, where, on rollback, there may be no need to apprise the target of the transaction at all, let alone any indication of how such a transaction ends.

Accordingly, the indicated changes forwarded to the target may be staged at the target in one or more external tables, for instance as data manipulation language (DML) statements corresponding to the changes, for anticipated application and commit to the target database. These one or more external tables may be different from the destinations in the target database mentioned previously.

FIG. 6B depicts example processing from a perspective of actions of a target side of a data replication relationship. The process receives (610) indications of changes made to a source database at a source as part of an ongoing transaction at the source. The changes are identified as the changes are made to the source database and as the transaction remains ongoing at the source, e.g. prior to commit or rollback of the transaction at the source. The source and the target are in a replication relationship in which data of the source database at the source is replicated to destinations (e.g. data tables) in a target database at the target. The process stages (612) the changes at the target in one or more data structures for anticipated application and commit to the target database.

The one or more data structures may be different from the destinations in the target database. As an example, the one or more data structures include one or more external tables implemented as one or more flat files at the target. The changes can be staged in the one or more external tables as data manipulation language (DML) statements corresponding to the changes. Additionally or alternatively, the receiving and staging are performed as the transaction remains ongoing at the source.

The process determines (614) whether the transaction is indicated as having ended. As long as the transaction has not ended (614, N), the process can loop through 610 and 612, receiving and staging changes on an ongoing basis as the transaction remains ongoing.

Based on an ending of the transaction at the source (for example by way of a commit or rollback of the transaction), an indication of such end may be received from the source by the target and inquiry 614 is answered in the positive (614, Commit or Rollback). Further processing is then performed at the target based on the transaction ending at the source and on receiving an indication of transaction end (e.g. commit, rollback) from the source.

In some cases, the transaction end includes a commit of the transaction at the source (614, Y—Commit). Process FIG. 6B proceeds by performing commit processing 616 at the target. For instance, the processing includes performing a bulk-apply of the identified changes to the target database. The bulk-apply can include a mirror bulk-apply of the staged changes in the one or more data structures, where the staged changes are batch-applied to the destinations in the target database based on a prepared statement job, and application of the staged changes on a row-by-row basis is avoided.

Additionally or alternatively, the commit processing 616 includes indicating, via a bookmark, a commit of the identified changes to the target database.

Additionally or alternatively, in some examples, the process of FIG. 6B applies to the target database the changes replicated from the source, and that occurs prior to the transaction ending at the source (i.e. prior to passing inquiry 614). The commit processing 616 can indicate, via a bookmark or other indicator, a commit of the identified changes to the target database.

In some cases, the transaction end of 614 includes a rollback of the transaction at the source (614, Y—Rollback). The process of FIG. 6B proceeds by performing rollback processing 618 at the target, which can be any desired processing.

At transaction end, then in some situations the identified changes have all been staged at the target while in other situations the changes are still in the process of being staged. In some examples, all (rather than just a portion) of the changes included in a transaction are staged at the target prior to commit or rollback of the transaction on the source.

Although various examples are provided, variations are possible without departing from a spirit of the claimed aspects.

Figure 7:
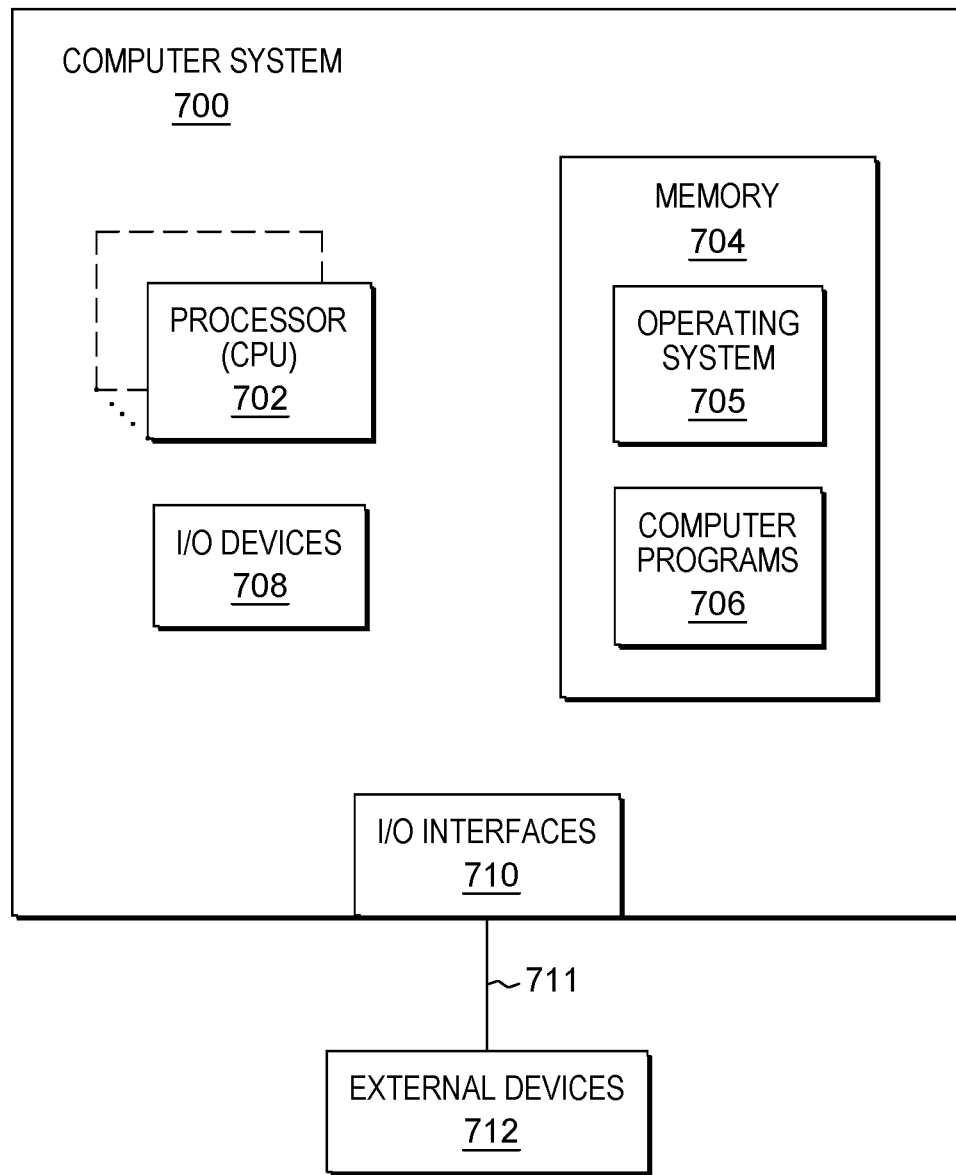
FIG. 7 depicts one example of a computer system and associated devices to incorporate and/or use aspects described herein.

Processes described herein may be performed singly or collectively by one or more computer systems, such as those described herein, as examples. FIG. 7 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 7 shows a computer system 700 in communication with external device(s) 712. Computer system 700 includes one or more processor(s) 702, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 702 can also include register(s) to be used by one or more of the functional components. Computer system 700 also includes memory 704, input/output (I/O) devices 708, and I/O interfaces 710, which may be coupled to processor(s) 702 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 704 can be or include main or system memory (e.g. Random Access Memory) used in the execution of program instructions, storage device(s) such as hard drive(s), flash media, or optical media as examples, and/or cache memory, as examples. Memory 704 can include, for instance, a cache, such as a shared cache, which may be coupled to local caches (examples include L1 cache, L2 cache, etc.) of processor(s) 702. Additionally, memory 704 may be or include at least one computer program product having a set (e.g., at least one) of program modules, instructions, code or the like that is/are configured to carry out functions of embodiments described herein when executed by one or more processors.

Memory 704 can store an operating system 705 and other computer programs 706, such as one or more computer programs/applications that execute to perform aspects described herein. Specifically, programs/applications can include computer readable program instructions that may be configured to carry out functions of embodiments of aspects described herein.

Examples of I/O devices 708 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (712) coupled to the computer system through one or more I/O interfaces 710.

Computer system 700 may communicate with one or more external devices 712 via one or more I/O interfaces 710. Example external devices include a keyboard, a pointing device, a display, and/or any other devices that enable a user to interact with computer system 700. Other example external devices include any device that enables computer system 700 to communicate with one or more other computing systems or peripheral devices such as a printer. A network interface/adapter is an example I/O interface that enables computer system 700 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 710 and external devices 712 can occur across wired and/or wireless communications link(s) 711, such as Ethernet-based wired or wireless connections. Example wireless connections include cellular, Wi-Fi, Bluetooth®, proximity-based, near-field, or other types of wireless connections. More generally, communications link(s) 711 may be any appropriate wireless and/or wired communication link(s) for communicating data.

Particular external device(s) 712 may include one or more data storage devices, which may store one or more programs, one or more computer readable program instructions, and/or data, etc. Computer system 700 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 700 may be operational with numerous other general purpose or special purpose computing system environments or configurations. Computer system 700 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
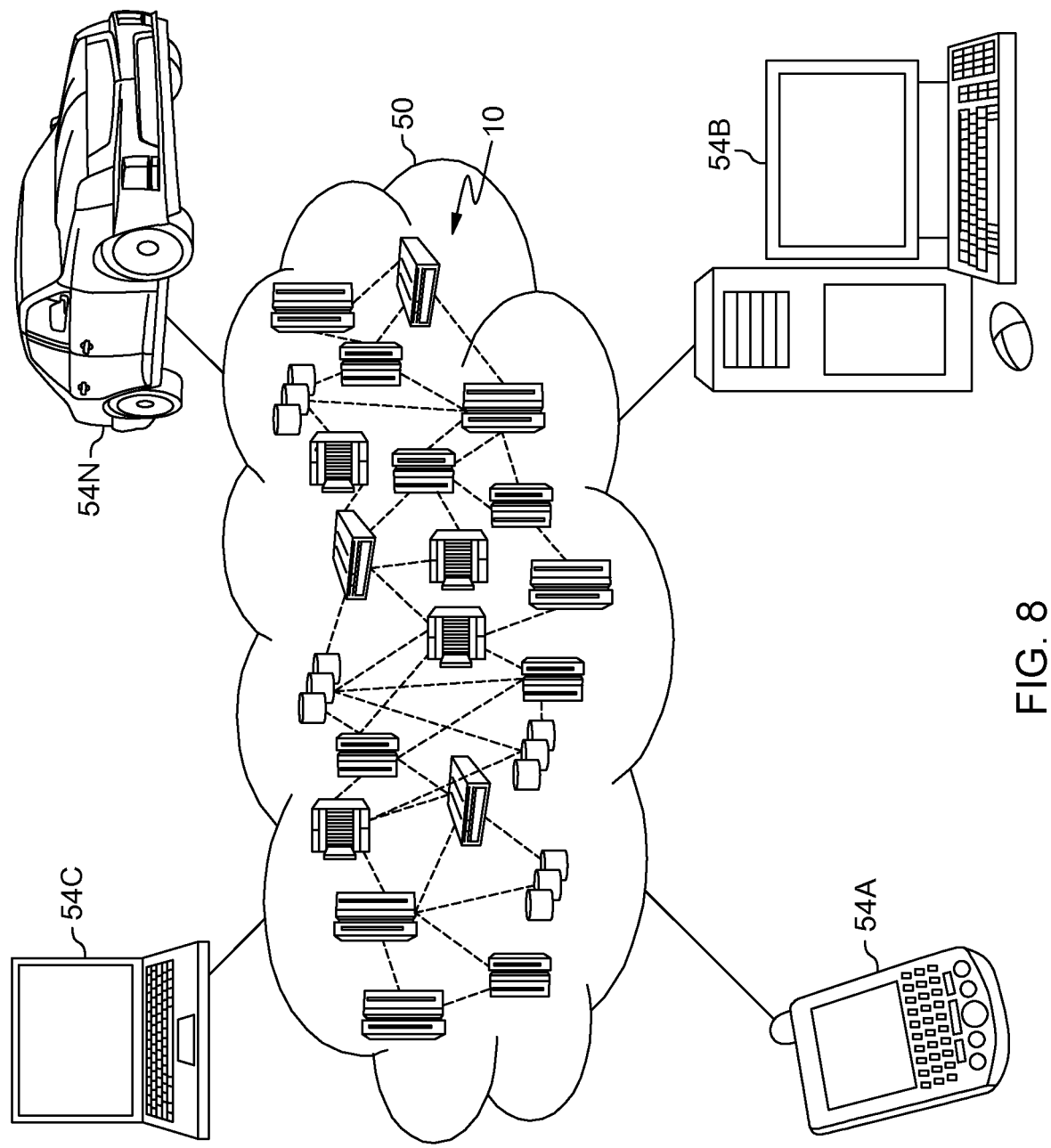
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
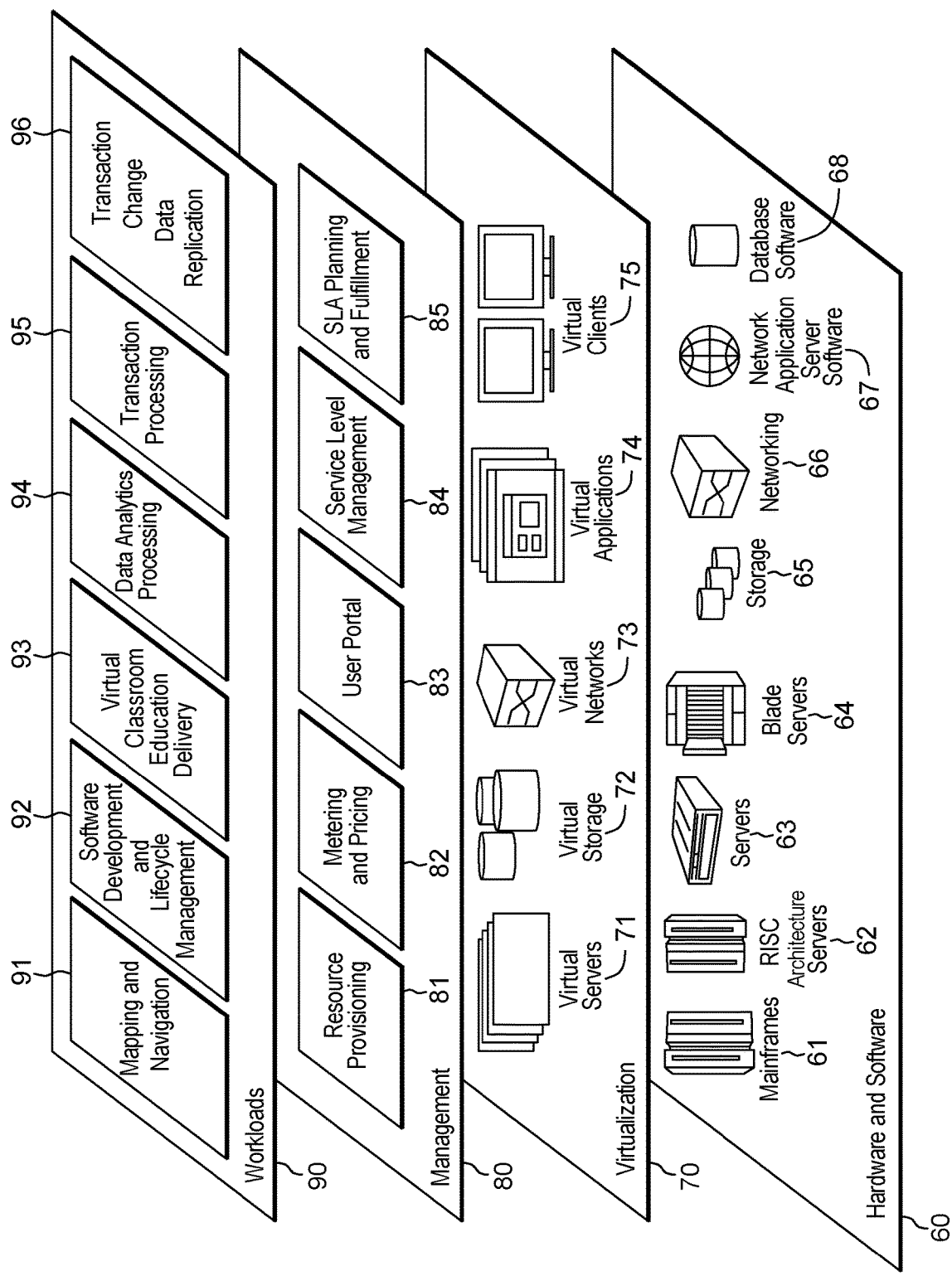
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transaction change data replication 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
identifying changes being made to a source database as part of an ongoing transaction at a source, the identifying being performed as the changes are made to the source database and as the transaction remains ongoing prior to commit or rollback of the transaction at the source, wherein the source and a target are in a replication relationship in which data of the source database at the source is replicated to destinations in a target database at the target;
forwarding, to the target, as the transaction remains ongoing prior to commit or rollback thereof, indications of the changes being made to the source for triggered bulk application of the changes to the target database, and removing from the source, as the transaction remains ongoing prior to commit or rollback thereof, one or more transaction log records that reflect the changes and based on which the identifying identifies the changes; and
based on ending the transaction at the source, sending to the target an indication of transaction end, the indication of transaction end indicating to the target whether or not to apply and commit the changes as part of the bulk application thereof to the target database.

2. The method of claim 1, wherein each identified change of the identified changes corresponds to a respective trigger to forward a respective indication of the identified change to the target.

3. The method of claim 2, wherein based on the respective trigger, the method further comprises writing data from a transaction queue to a staging store at the source, and sending the data, as the indication of the change, across a network to a target agent of the target, as the transaction remains ongoing.

4. The method of claim 1, wherein the identifying comprises reading one or more transaction logs at the source and parsing transaction log records for the changes.

5. The method of claim 4, wherein the parsing the transaction log records for the changes identifies data manipulation language statements that are identified by the transaction log records and are in-scope of the replication relationship, wherein the indications of the changes comprise the in-scope data manipulation language statements, the in-scope data manipulation language statements being forwarded to add to a batch job to be applied at the target.

6. The method of claim 1, wherein at transaction end, the identified changes have all been forwarded to the target as part of the forwarding.

7. The method of claim 1, wherein, based on the forwarding, all changes included in the transaction are forwarded to and staged at the target prior to commit or rollback of the transaction at the target.

8. The method of claim 1, wherein the transaction end comprises a rollback of the transaction at the source, and wherein the indication of transaction end sent to the target comprises an indication of rollback of the transaction.

9. The method of claim 1, wherein the changes are staged at the target in one or more external tables as data manipulation language (DML) statements corresponding to the changes, for anticipated application and commit to the target database, the one or more external tables being different from the destinations in the target database.

10. A computer system comprising:
a memory; and
a processor in communication with the memory, wherein the computer system is configured to perform a method comprising:
identifying changes being made to a source database as part of an ongoing transaction at a source, the identifying being performed as the changes are made to the source database and as the transaction remains ongoing prior to commit or rollback of the transaction at the source, wherein the source and a target are in a replication relationship in which data of the source database at the source is replicated to destinations in a target database at the target;
forwarding, to the target, as the transaction remains ongoing prior to commit or rollback thereof, indications of the changes being made to the source for triggered bulk application of the changes to the target database, and removing from the source, as the transaction remains ongoing prior to commit or rollback thereof, one or more transaction log records that reflect the changes and based on which the identifying identifies the changes; and
based on ending the transaction at the source, sending to the target an indication of transaction end, the indication of transaction end indicating to the target whether or not to apply and commit the changes as part of the bulk application thereof to the target database.

11. The computer system of claim 10, wherein each identified change of the identified changes corresponds to a respective trigger to forward a respective indication of the identified change to the target.

12. The computer system of claim 11, wherein based on the respective trigger, the method further comprises writing data from a transaction queue to a staging store at the source, and sending the data, as the indication of the change, across a network to a target agent of the target, as the transaction remains ongoing.

13. The computer system of claim 10, wherein the identifying comprises reading one or more transaction logs at the source and parsing transaction log records for the changes, wherein the parsing the transaction log records for the changes identifies data manipulation language statements that are identified by the transaction log records and are in-scope of the replication relationship, and wherein the indications of the changes comprise the in-scope data manipulation language statements, the in-scope data manipulation language statements being forwarded to add to a batch job to be applied at the target.

14. The computer system of claim 10, wherein at transaction end, the identified changes have all been forwarded to the target as part of the forwarding.

15. The computer system of claim 10, wherein the changes are staged at the target in one or more external tables as data manipulation language (DML) statements corresponding to the changes, for anticipated application and commit to the target database, the one or more external tables being different from the destinations in the target database, wherein the transaction end comprises a rollback of the transaction at the source, and wherein the target retains the identified changes despite receiving the indication of rollback from the source.

16. A computer program product comprising:
a computer readable storage medium readable by a processing circuit and storing instructions for execution by the processing circuit for performing a method comprising:

identifying changes being made to a source database as part of an ongoing transaction at a source, the identifying being performed as the changes are made to the source database and as the transaction remains ongoing prior to commit or rollback of the transaction at the source, wherein the source and a target are in a replication relationship in which data of the source database at the source is replicated to destinations in a target database at the target;

forwarding, to the target, as the transaction remains ongoing prior to commit or rollback thereof, indications of the changes being made to the source for triggered bulk application of the changes to the target database, and removing from the source, as the transaction remains ongoing prior to commit or rollback thereof, one or more transaction log records that reflect the changes and based on which the identifying identifies the changes; and based on ending the transaction at the source, sending to the target an indication of transaction end, the indication of transaction end indicating to the target whether or not to apply and commit the changes as part of the bulk application thereof to the target database.

17. The computer program product of claim 16, wherein each identified change of the identified changes corresponds to a respective trigger to forward a respective indication of the identified change to the target, and wherein based on the respective trigger, the method further comprises writing data from a transaction queue to a staging store at the source, and sending the data, as the indication of the change, across a network to a target agent of the target, as the transaction remains ongoing.

18. The computer program product of claim 16, wherein the identifying comprises reading one or more transaction logs at the source and parsing transaction log records for the changes, wherein the parsing the transaction log records for the changes identifies data manipulation language statements that are identified by the transaction log records and are in-scope of the replication relationship, and wherein the indications of the changes comprise the in-scope data manipulation language statements, the in-scope data manipulation language statements being forwarded to add to a batch job to be applied at the target.

19. The computer program product of claim 16, wherein at transaction end, the identified changes have all been forwarded to the target as part of the forwarding.

20. The computer program product of claim 16, wherein the changes are staged at the target in one or more external tables as data manipulation language (DML) statements corresponding to the changes, for anticipated application and commit to the target database, the one or more external tables being different from the destinations in the target database, wherein the transaction end comprises a rollback of the transaction at the source, and wherein the target retains the identified changes despite receiving the indication of rollback from the source.

* * * * *